Oct. 11, 1966  D. K. SMOOT  3,277,633
SELF-CLEANING FILTER MECHANISM
Filed June 10, 1963  3 Sheets-Sheet 1

INVENTOR.
DAVID K. SMOOT
BY
Fishburn and Gold
ATTORNEYS

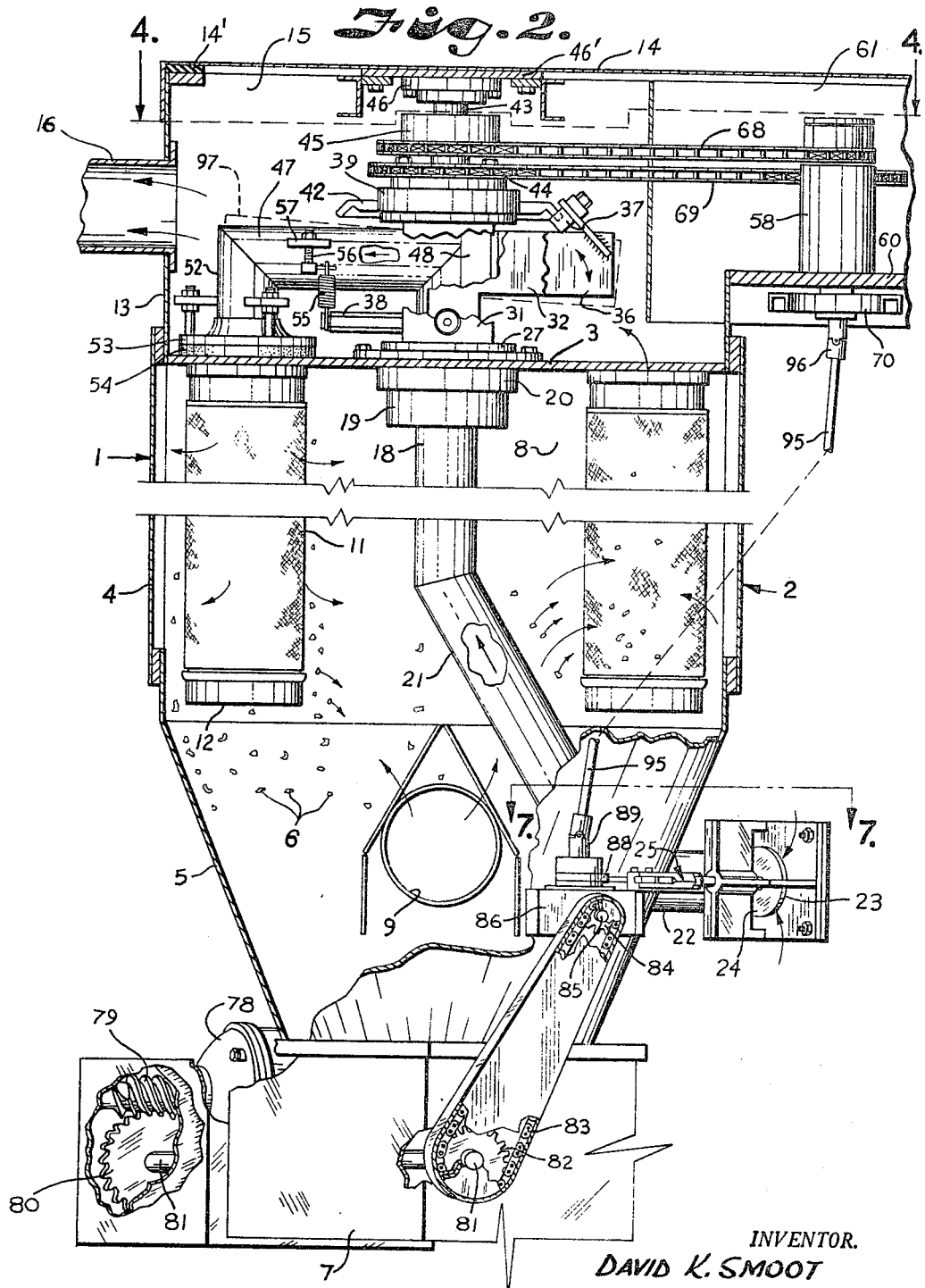

Oct. 11, 1966  D. K. SMOOT  3,277,633
SELF-CLEANING FILTER MECHANISM
Filed June 10, 1963  3 Sheets-Sheet 3
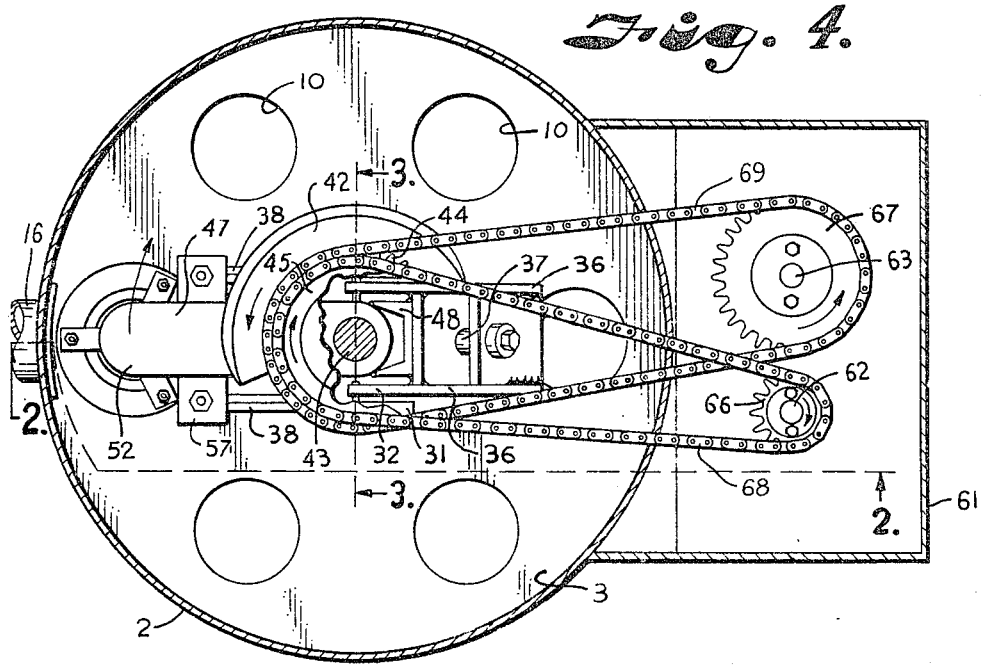
INVENTOR.
DAVID K. SMOOT
BY
Fishburn and Gold
ATTORNEYS

United States Patent Office 3,277,633
Patented Oct. 11, 1966

3,277,633
SELF-CLEANING FILTER MECHANISM
David K. Smoot, 1707 E. 9th St., Kansas City, Mo.
Filed June 10, 1963, Ser. No. 286,607
7 Claims. (Cl. 55—302)

This invention relates to continuous operation air filters of the reverse flow self cleaning type adapted to remove solid particles from the air.

In reverse flow cleaning air filters a plurality of filter members are mounted on a plate or the like in circumferential relation for simultaneous filtering operation and rotatable conduit means are supported for selective sequential contact with the respective filtering means for individually reversing the direction of flow therethrough to dislodge filtered particles adhering to the surface. The reverse flow cleaning occurs simultaneously with overall filter operation but momentarily takes a single filter member out of service. It is highly desirable that a good seal be maintained at the temporary connection between the filter member passageway and the reverse flow conduit to prevent leakage during the reverse flow which would result in a substantial lowering of overall filter efficiency. A good seal generally requires high contact forces, and heretofore such forces, coupled with the rotational motion of the reverse flow conduit and in the presence of dust, produced sliding friction forces of high magnitude causing rapid wearing of parts.

The principal objects of the present invention are: to provide an air filter reverse flow cleaning mechanism which provides a tight seal between the reverse flow conduit and filter member passageway without relative sliding motion between the sealing surfaces; to provide such a reverse flow mechanism which utilizes a Geneva type drive to positively but intermittently position the various parts for reverse flow cleaning; to provide such an air filter cleaning mechanism wherein the mouth of the reverse flow conduit is lifted axially away from a filter passageway before being sequentially rotated to another filter passageway whereupon the conduit mouth is directed axially against the latter passageway for coupling thereto; and to provide such a dust collecting mechanism which is simple and rugged in construction and maintains high filtering efficiency over long periods of time with surprisingly little maintenance.

Other objects and advantages of this invention will become apparent from the following description taken in connection with the accompanying drawings wherein are set forth by way of illustration and example certain embodiments of this invention.

FIG. 2 is a vertical cross-sectional view on an enlarged scale taken on the line 2—2, FIG. 4, through the filter mechanism particularly showing the reverse flow members therewithin.

FIG. 3 is a fragmentary vertical cross-sectional view on an enlarged scale through the filter mechanism taken on the line 3—3, FIG. 4, particularly showing the mounting and rotating structure for the reverse flow conduit.

FIG. 4 is a cross-sectional plan view through the filter mechanism taken on the line 4—4, FIG. 2 particularly showing the driving parts for reverse flow members.

FIG. 7 is a fragmentary cross-sectional plan view taken on the line 7—7, FIG. 2 showing a quick-opening valve and control linkage therefor by which reverse flow is directed through the conduit member when the member is sealed against a filter passageway.

Figure 1:
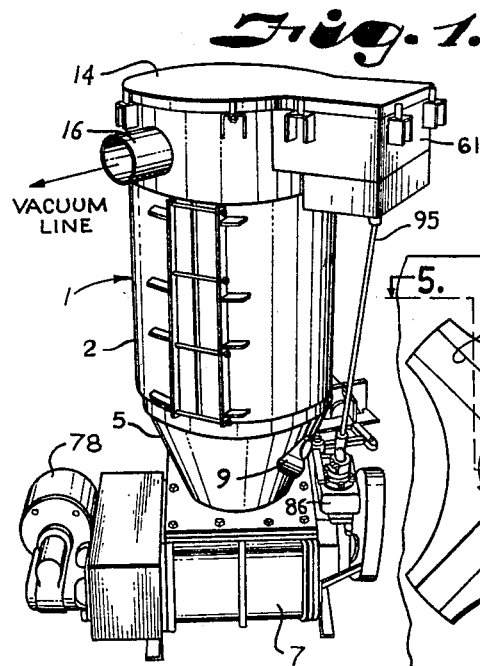
FIG. 1 is a perspective view showing a reverse flow cleaning filter mechanism embodying this invention.
Figure 6:
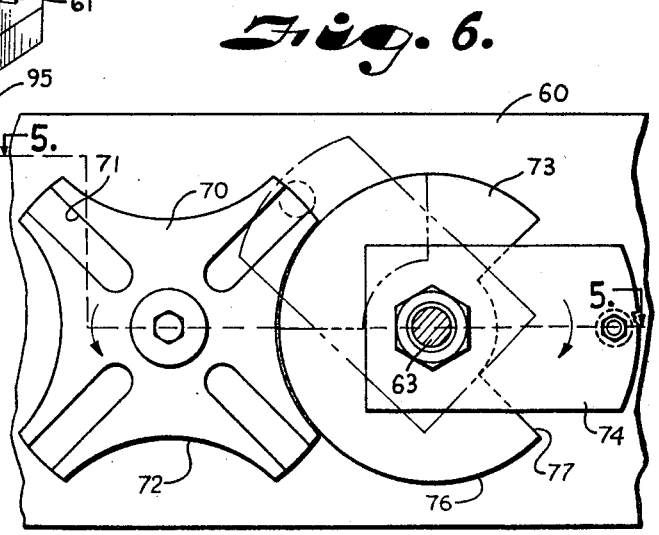
FIG. 6 is a fragmentary cross-sectional view through the filter mechanism taken on the line 6—6, FIG. 5, illustrating further details of the Geneva mechanism.
Figure 5:
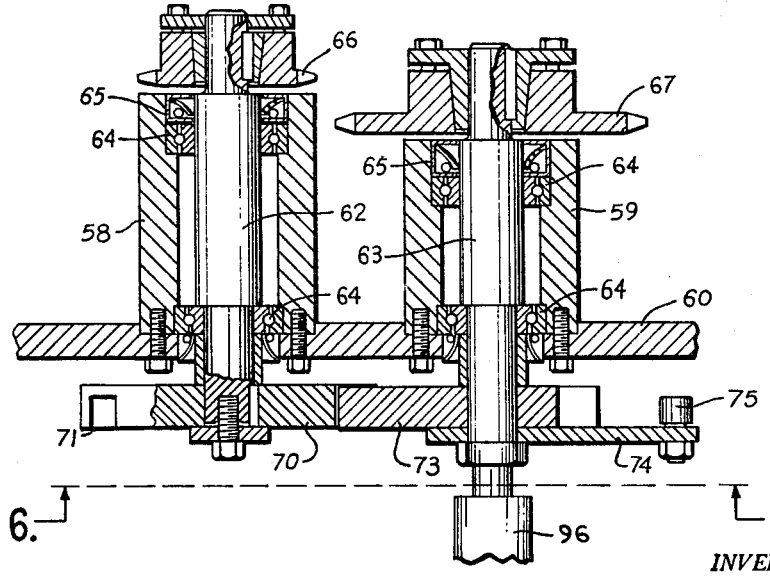
FIG. 5 is a vertical cross-sectional fragmentary view through the filter mechanism taken on the line 5—5, FIG. 5 showing a Geneva mechanism for imparting synchronized intermittent motion to the reverse flow conduit.

Referring to the drawings is more detail:

The reference numeral 1 generally indicates an air filtering apparatus of the reverse flow cleaning type. The apparatus 1 includes a housing 2 formed of a horizontal wall 3 and a connected depending vertical cylindrical wall 4 which tapers inwardly at the lower portion 5 thereof forming a funnel for directing filter particles 6 to a conventional air-lock particle conveyor 7. The walls 3 and 4 define a filter chamber 8 communicating with an inlet tube or line 9 through which dust or particle laden air may be directed for filtering. The housing horizontal wall 3 has a plurality of equally circumferentially and equally radially spaced outlet passageways 10 extending therethrough, each of the passageways having a filter sleeve member 11 communicating therewith and depending into the filter chamber 8. The filter sleeve members 11 are closed at the lower ends 12 thereof and are suitable rigidly constructed whereby air flow upwardly through the respective outlet passageways 10 passes through the walls of the filter sleeve members 11 without causing wall collapsing.

A cylindrical side wall 13 extends upwardly from the housing horizontal wall 3 and is covered by a removable lid forming a horizontal wall 14. A suitable rubber seal 14' is positioned between the walls 13 and 14. The walls 13 and 14 cooperate with the wall 3 to form a suction chamber 15 communicating with the outlet passageways 10. A vacuum tube or line 16 communicates with the suction chamber 15 through the side wall 13 for producing a partial vacuum in the suction chamber 15 whereby air filtered through the filter sleeve members 11 is exhausted from the filter chamber 8. The inlet tube or line 9 is normally under a lesser vacuum than the outlet line 16 whereby particle laden air is drawn through the inlet line 9 into the apparatus.

A central passageway 17 extends through the housing horizontal wall 3 at the radial center of the outlet passageways 10. The central passageway 17 communicates with a depending tube 18 at the upper end of said tube by means of a mounting collar 19 secured to a bearing housing 20 anchored to the horizontal wall 3. The depending tube 18 extends first downwardly and then obliquely at 21 and finally laterally through the housing vertical wall 4 at 22, terminating in a lower end 23 in the atmosphere externally of the filter chamber 8.

A quick opening valve 24 normally closes the lower end 23 and is operated through a valve linkage 25 described more fully hereinafter.

A ring bearing 26 is mounted in fixed position with respect to the horizontal wall 3 by means of the bearing housing 20 and surrounds the central passageway 17. A first turntable member 27 has an unobstructed central passageway 28 extending upwardly therethrough and is rotatably mounted on the ring bearing 26 for rotation about an axis 29 extending perpendicular to the housing horizontal wall 3. A seal 30 is supported by the bearing housing 20 in sliding contact with the first turntable member 27 to prevent air flow into the central passageway 28 except through the depending tube 18. A pair of rigid spaced apart upwardly extending side walls 31 are secured to and form a part of the first turntable member 27.

A cradle 32 is pivotally mounted on the side walls 31 by means of lateral pins 33 threadedly secured thereto and extending through bearings 34 mounted in the respective side walls 31. The cradle 32 is adapted to pivot on an axis 35 extending normal to the first turntable axis 29. A pair of spaced apart parallel rigid legs 36 are fixed to and extend generally horizontally outwardly from the cradle 32 as best depicted in FIGS. 2 and 4. A cam follower 37 is secured to and between the rigid legs 36 and is spaced radially from the first turntable axis 29. A pair of spaced apart parallel posts 38 are fixed to the respective turntable side walls 31 and extend generally horizontally therefrom in a direction radially opposite to the legs 36.

A second turntable member 39 is coaxially rotatably mounted on a bearing 40 which is in turn supported on a plate 41 secured to and extending across the top of the side walls 31. The second turntable member is spaced above the legs 36 and a circular section cam 42 is fixed to the second turntable member and extends radially outwardly therefrom, in the illustrated example, over approximately 180°. The cam 42 is adapted to engage the cam follower 37 upon relative rotation between the first and second turntable members for selectively pivoting the cradle 32 about the horizontal axis 35.

A vertical shaft 43 is fixed to the plate 41 and extends coaxially with the axis 29 upwardly through the second turntable member 39. A chain sprocket 44 is secured to the second turntable member 39 for coaxial rotation about the shaft 43 and a chain sprocket 45 is secured to the shaft 43 for coaxial rotation with respect to the sprocket 44, the rotation of the sprocket 45 producing rotation of the first turntable member 27 on the ring bearing 26. Thus, the first and second turntable members are adapted to be rotatably driven relatively with respect to each other and with respect to the horizontal wall 3 although both are ultimately supported by the single ring bearing 26. The shaft 43 extends upwardly into a support bearing 46 mounted on a transverse channel structure 46' secured to the side wall 13 for adding rigidity to the respective turntable members.

A rigid conduit tube member 47 is secured to the cradle 32 at 48 and extends generally radially from the vertical axis 29 above and between the posts 38. The conduit member 47 extends in a radial direction opposite to the rigid legs 36 and has a depending inner mouth portion 49 communicating with the central passageway 28 through a flexible sleeve portion 50 and rigid sleeve 51 which is mounted on the first turntable member 27 within the central passageway 28. The flexible sleeve portion 50 is secured to the mouth portion 49 and sleeve 51 by suitable ring clamps 51'.

The conduit member 47 includes a depending outer mouth portion 52 located on a radius aligned with the radius of the outlet passageways 10. The outer mouth portion 52 terminates at the lower end thereof in an annular flange member 53 having a sponge rubber annular seal 54 secured thereto and adapted to seal against the upper surface of the housing horizontal wall 3 successively surrounding each of the outlet passageway 10. Vertically extending helical tensile springs 55 are anchored at the upper ends thereof to respective adjustable support members 56 secured to the conduit member 47 by means of laterally extending ears 57. The lower ends of the tensile springs 55 are anchored to the respective posts 38 for resiliently urging the conduit member outer mouth portion 52 pivotally downwardly into sealing contact with one of the outlet passageways 10 when the cam 42 is not engaging the cam follower 37.

First and second vertically extending spaced apart support sleeves 58 and 59 are respectively mounted on a lower horizontal wall 60 which forms part of a closed lateral extension housing 61 projecting from the suction chamber 15. First and second spaced apart vertical shafts 62 and 63 respectively extend coaxially within the sleeves 58 and 59 and bearings 64 within the sleeves rotatably support the respective shafts. Suitable seals 65 are mounted adjacent the bearings 64 and slidably bear against the respective shafts 62 and 63 for preventing unwanted air leakage into the suction chamber 15. The upper ends of the shafts 62 and 63 respectively extend above the sleeves 58 and 59 and chain drive sprockets 66 and 67 are fixed thereon at respective levels corresponding to the levels of the coaxial sprockets 45 and 44. Chains designated 68 and 69 are respectively engaged with and extend between the sprockets 66 and 45 and the sprocket 67 and 44.

The shafts 62 and 63 depend beneath the wall 60 and a Geneva driven wheel 70 is fixed to the shaft 62 externally of the housing 61. The Geneva driven wheel has a plurality of radical slots 71 and arcuate recessed peripheral portions 72 between each of the slots 71. A Geneva driver 73 is fixed to the depending external portion of the shaft 63 and has a radially extending leg 74 terminating in a cam follower tooth 75 selectively engageable in the slots 71 for imparting positive but intermittent motion to the driven wheel 70. The Geneva driver 73 also includes a circular outer edge or peripheral portion 76 adapted to engage in the recessed portions 72 of the driven wheel 70 for preventing rotation of the shaft 62 in either direction when the cam follower tooth 75 is not engaged in a radial slot 71. The outer edge portion 76 is recessed at 77 adjacent the leg 74 to permit the intermittent motion of the driven wheel 70 to occur during cam follower tooth engagement with the respective radial slots 71.

The particle conveyor 7 is driven by means of a motor 78 which, through speed reduction gears 79 and 80, rotates a shaft 81. The shaft 81 extends through the particle conveyor 7 and has a sprocket 82 secured thereto and engaging a chain 83. The chain 83 in turn engages a sprocket 84 mounted on a shaft 85 forming the input to a gear box 86. The output shaft 87 of the gear box 86 has a cam 88 and a universal joint 89 fixed thereto for simultaneous rotation. The valve linkage 25, noted above, includes radially extending arms 90 and 91 pivotally mounted to a bracket 92. The arm 90 has a cam follower wheel 93 which bears against the cam 88 for translating motion to the arm 91. The arm 91 is engaged in an axial valve stem 94 for axially displacing the quick-opening valve 24 to permit air at atmospheric pressure to enter the lower end 23 of the depending tube 18. It is noted that the active cam surface consists of a narrow tooth 94' whereby the quick-opening valve 24 is held open only a very short period of time to permit a blast or pulse of air to enter the depending tube 18.

The U-joint 89 connects to an elongated shaft 95 which in turn connects to another U-joint 96 fixed to the depending portion of the vertical shaft 63 for rotating the Geneva driver 73 in sychronization with the cam 88.

The cam 42 is rotatably relatively positioned to lift the outer mouth portion 52 only during periods of rotational rest and permit the springs 55 to lower the outer mouth portion only upon a subsequent rotational pausing of the mouth portion. In other words, the mouth portion 52 will move vertically only when it is at rotational rest. The Geneva driver and driven wheel and the respective driving sprockets are proportioned to sequentially cause the rotational pausing of the outer mouth portion only when said mouth portion is over an outlet passageway 10.

In operation, the vacuum line 16 is maintained below atmospheric pressure for withdrawing filtered air from the apparatus 1. Air containing particles or dust to be filtered is drawn into the filter chamber 8 by means of the vacuum produced in the suction chamber 15. The differential between the suction chamber 15 and filter chamber 8 causes air to flow through the several filter sleeve members 11 simultaneously and out the respective outlet passageways 10, the particles 6 being trapped on the outside surface of the respective filter sleeve members. The continuous operation of the motor 78 results in the continuous rotation of the cam 42 which, during each rotation, contacts the cam follower 37 to raise or tilt the conduit member outer mouth portion 52 substantially to the extent indicated by the broken line at 97. While the conduit member is thus tilted the Geneva driven wheel is engaged by the cam follower tooth 75 which causes a rotation of the conduit member through an arc which places the outer mouth portion 52 above another outlet passageway 10. Subsequently the cam 42 disengages from the cam follower 37 and the tension springs 55 urge the conduit member 47 pivotally downwardly about the axis 35 causing firm sealing engagement of the wall 3 against the seal 54. Thus, complete sealing is obtained between the outer mouth portion and the respective outlet passageway without relative sliding therebetween. While the conduit 47 is thus engaged with the particular outlet passageway the quick opening valve 24 is operated to send a high velocity atmospheric pressure pulse through the particular filter sleeve 11 which dislodges particles trapped on the surface thereof permitting the particles to drop downwardly into the particle conveyor 7 and clearing the filter sleeve member for further filtering operations.

It is to be understood that while one form of this invention has been illustrated and described it is not to be limited to the specific form or arrangement of parts herein described and shown except insofar as such limitations are included in the claims.

What I claim and desire to secure by Letters Patent is:

1. In a fluid filter, reverse flow cleaning apparatus comprising:
   (a) a plurality of filter elements each having normally open flow passageway means communicating thereinto, said passageway means being positioned in spaced apart locations about a central point,
   (b) a reverse flow conduit having a mouth adapted to sealingly engage with said respective passageway means providing communication between the respective filter element and conduit, motive means supporting said conduit with said mouth normally spaced from said passageway means and adapted to intermittently rotate said conduit for bringing said mouth into successive register, but not engaging, said passageway means,
   (c) reciprocating means associated with said motive means for reciprocating said conduit mouth transversely to said rotation into sealing engagement with said respective passageway means,
   (d) means operably interconnecting said reciprocating means and motive means to cause said reciprocation only in absence of said rotation, and
   (e) means for urging reverse fluid flow through said conduit and into the respective filter element during sealing contact between said mouth and a passageway means.

2. In fluid filtering apparatus, a housing forming a filter chamber, said housing having means forming a plurality of equally radially spaced outlet passageways leading from said filter chamber, each of said outlet passageways having a filter member communicating therewith means forming a fluid receiving chamber communicating with said outlet passageways, an exhaust line communicating with said receiving chamber, an inlet line communicating with said filter chamber for conducting fluid thereinto for filtering, means forming a central passageway on the radial axis of said outlet passageways, a tube communicating at one end thereof with said central passageway and at the other end thereof with a source of fluid at greater pressure than in said filter chamber, a valve normally closing said tube, a turntable member mounted on said housing at said central passageway for rotation about said axis, a conduit member mounted on said turntable member for reciprocable movement in a direction substantially parallel to said axis, said conduit member having an inner mouth portion communicating with said central passageway and an outer mouth portion located on a radius aligned with said outlet passageways, means for sequentially reciprocating said outer mouth portion substantially axially into and out of sealing contact with said respective outlet passageway forming means, means for intermittently rotating said turntable member for bringing said outer mouth portion into register with successive outlet passageways, means operably interconnecting said reciprocating means and intermittent rotating means to permit said reciprocation only in the absence of said rotation, and means for momentarily opening said valve during said sealing contact for momentarily urging reverse flow through successive filter members.

3. The apparatus as set forth in claim 2 wherein said conduit member is pivotally mounted on said turntable member for said reciprocal movement in a plane parallel to said axis.

4. The apparatus as set forth in claim 2 including a resilient seal on said outer mouth portion for sequentially sealing against said outlet passageway forming means and surrounding said outlet passageways.

5. The apparatus as set forth in claim 2 wherein said intermittent rotating means includes a Geneva mechanism having a driven wheel operably connected to said turntable.

6. The apparatus as set forth in claim 2 wherein said reciprocating means includes a second turntable rotatably coaxially mounted and driven with respect to said first named turntable and supporting a cam operably engageable with said conduit member for inducing said reciprocation.

7. In an air filtering apparatus of the reverse flow cleaning type, a housing forming a filter chamber including a wall having means forming a plurality of equally radially spaced outlet passageways therethrough, each of said outlet passageways having a filter member communicating therewith, means forming a suction chamber communicating with said outlet passageways, a central passageway through said housing wall at the radial axis of said passageways, a tube joined adjacent one end thereof to said housing wall and communicating with said central passageway, said tube extending through said housing and terminating at the other end thereof in the atmosphere externally of said filter chamber, a valve normally closing said tube, a first hollow turntable member mounted on said housing wall for rotation about said radial axis, a cradle pivotally mounted on said first turntable member on an axis normal to said radial axis, a second turntable member rotatably mounted on said first turntable member, cam means fixed to said second turntable member and adapted to engage said cradle upon relative rotation between said first and second turntable members for reciprocably pivoting said cradle, a conduit member fixed to said cradle and rotatable therewith and extending therefrom, said conduit member having a flexible inner mouth portion communicating through said first turntable member with said central passageway and an outer mouth portion located on the radius of said outlet passageways for sealing against succeeding outlet passageways during pivoting of said cradle, first and second spaced apart rotatable shafts extending in said suction chamber and respectively having drive means operably connected to said first and second turntable members for rotating same, a Geneva driven wheel fixed to said first shaft for intermittently rotating said first turntable member, a Geneva driver fixed to said second shaft and engaging said Geneva driven wheel for imparting positive but intermittent motion to said Geneva driven wheel, and driving means for rotating said second shaft at a substantially constant speed, said driving means being operably connected to said valve for intermittently opening same in synchronization with the sealing of said outer mouth portion, said cam means being positioned to lift said outer mouth portion away from said chamber wall and out of sealing engagement prior to rotational movement of said conduit member.

References Cited by the Examiner

UNITED STATES PATENTS

| | | | |
|---|---|---|---|
| 2,800,976 | 7/1957 | Pellon | 55—302 |
| 2,844,216 | 7/1958 | Swanson | 55—302 |
| 2,976,953 | 3/1961 | Haas et al. | 55—294 |

FOREIGN PATENTS 625,842   8/1961   Canada.

HARRY B. THORNTON, *Primary Examiner.*